United States Patent
Fogelberg et al.

Patent Number: 5,568,114
Date of Patent: Oct. 22, 1996

[54] WINDING SUPPORT BODY FOR TRANSFORMERS/REACTORS WITH SUPERCONDUCTORS

[75] Inventors: Thomas Fogelberg, Ludvika; Uno Gäfvert; Sven Hörnfeldt, both of Västerås, all of Sweden

[73] Assignee: ASEA Brown Boveri AB, Västerås, Sweden

[21] Appl. No.: 373,221

[22] PCT Filed: Aug. 27, 1993

[86] PCT No.: PCT/SE93/00676
§ 371 Date: Jan. 19, 1995
§ 102(e) Date: Jan. 19, 1995

[87] PCT Pub. No.: WO94/06133
PCT Pub. Date: Mar. 17, 1994

[30] Foreign Application Priority Data

Aug. 27, 1992 [SE] Sweden .................. 9202455

[51] Int. Cl.$^6$ .................................. H01F 7/22
[52] U.S. Cl. .................... 336/206; 336/DIG. 1; 336/231; 336/205
[58] Field of Search ........................ 336/205, 206, 336/199, 216, DIG. 1

[56] References Cited

U.S. PATENT DOCUMENTS

| | | | |
|---|---|---|---|
| 4,001,746 | 1/1977 | Tjernstrom et al. | 336/62 |
| 4,270,112 | 5/1981 | Schneider-Muntau et al. | 336/197 |
| 4,682,134 | 7/1987 | Laskaris | 336/DIG. 1 |
| 5,426,408 | 6/1995 | Jones et al. | 336/DIG. 1 |

Primary Examiner—Leo P. Picard
Assistant Examiner—G. R. Lord
Attorney, Agent, or Firm—Watson Cole Stevens Davis, P.L.L.C.

[57] ABSTRACT

A winding support body (6, 10) for transformers/reactors with a winding of a tape-formed superconductor (8), wherein the support body consists of a substantially straight, circular-cylindrical tubular body which, on the side where the winding is to be placed and out towards the two ends, is provided with a helical slot with a plane surface with a width equal to the width of the tape. In this way, each turn of the slot around the support body forms a surface which practically constitutes the envelope surface of a straight frustum of a cone. The angle (v) between a generatrix (9) of the envelope surface and the axial center line of the support body increases for each turn out towards the ends of the support body in such a way that the envelope surface at all points coincides with the direction of the magnetic field (FIG. 4).

1 Claim, 1 Drawing Sheet

WINDING SUPPORT BODY FOR TRANSFORMERS/REACTORS WITH SUPERCONDUCTORS

BACKGROUND OF THE INVENTION

1. Field of The Invention

One important condition for transformers/reactors to be provided with superconducting windings while at the same time becoming a commercial and competitive product in relation to transformers/reactors with conventional windings is that the unavoidable a.c. losses are minimized. In the same way as sheet-wound windings are used in conventional transformers/reactors, the superconductor can be designed as a sheet or a tape to reduce the losses. At the same time, it is very important that the orientation of the conductor relative to the direction of the magnetic field be chosen in an optimal manner. The present invention relates to a winding support body with the aid of which the conductor is oriented such that the direction of the magnetic field coincides with the plane of the conductor.

2. Description Of The Prior Art

Characteristic of superconductors is that the current density is much higher than in metallic conductors. A superconductor which is to be used in a transformer winding/reactor winding is suitably given the shape of a tape, that is, the width thereof is considerably larger than the thickness. The tape preferably consists of a number of superconducting filaments embedded into a metallic matrix. This, however, means that with such a conductor the mechanical strength of the winding is not sufficient to support the magnetic forces which may arise. Therefore, the conductor needs a mechanical support in the form of a winding support body. Since the prior art at present does not comprise transformers/reactors with superconductors, there is also no prior art regarding the design of winding support bodies for such windings.

With respect to transformers, the magnetic field configuration for two concentric windings 1 and 2 around a limb 3 of a transformer core will have an appearance as shown in FIG. 1. The substantially axial leakage flux 4 extending between the windings is deflected in a more or less radial direction at the ends of the windings in order to enter the core. This causes the ends of the windings to be traversed by a magnetic flux with a radial component which generates eddy currents in the conductor and causes losses.

It is therefore natural, in describing the prior art, to start from the technique which has been used for a long time in conventional sheet-wound transformer windings to achieve the desired orientation in relation to the direction of the magnetic field. A typical example of this technique is disclosed in U.S. Pat. No. 4,323,870. Instead of attempting to influence the field configuration, the conductor material is allowed to follow the field. This is done in such a way that the tape is formed such that the magnetic field vector at each point is tangent to the conductor surface. In this way, the current displacement can be eliminated. The accompanying FIG. 2, which is identical with FIG. 1 in the above US patent shows how sheet-wound windings can be designed to achieve this desired effect. The inward rounding towards the core limb is brought about by rounding off the winding support body 5, which is really not necessary from a mechanical point of view, at the ends towards the core limb, and the outward rounding can be performed with the aid of wedges or linings of different kinds. This method, however, entails an increased space requirement, increased radius of the windings resulting in increased losses, and a relatively time-consuming and difficult winding work.

SUMMARY OF THE INVENTION

A winding support body according to the invention comprises a substantially straight, circular-cylindrical tubular body. On the side where the winding is to be placed, the body is provided, towards both its ends, with a helical slot along the body with a plane surface having a width equal to the width of the conductor. In this way, each turn of the slot around the body out towards the ends forms a surface which practically constitutes the envelope surface of a frustum of a cone. The angle between a generatrix of the envelope surface of the straight frustum of a cone and the axial centre line of the body increases continuously towards the ends of the body such that the envelope surface at all points coincides with the direction of the magnetic field. The midportion of the body has a circular-cylindrical envelope surface without slots. Because of the helical slot along the ends of the body, the superconducting tape can be wound continuously in one or more layers along the entire body.

One advantage of the described design in relation to the above-described technique for sheet-wound windings is that the winding is given a circular-cylindrical shape. This means a transformer of a more compact design since no increased space for adaptation to the magnetic field according to FIG. 2 is needed.

In addition to the possibility of minimizing the occurrence of eddy currents according to the invention, such a winding support body entails an additional advantage. The periodic force with twice the power frequency, which force is proportional to the product of the current intensity in the conductor and the magnitude of the magnetic field in which the conductor occurs, and to which the current-carrying conductor is subjected, is given a direction which is perpendicular to the base at all points. This means that the binder which is used to bind the conductor to the support body is subjected to small stresses.

DESCRIPTION OF THE PREFERRED EMBODIMENTS

Figure 1:
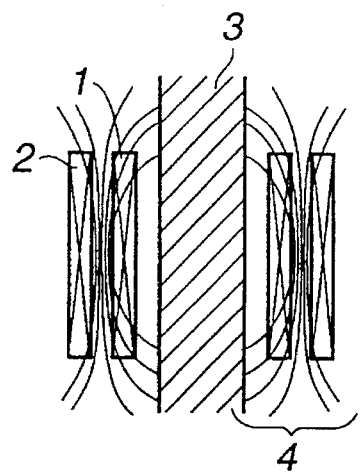
FIG. 1 schematically shows the magnetic field configuration of two concentric transformer windings around a limb of a transformer core.
Figure 2:
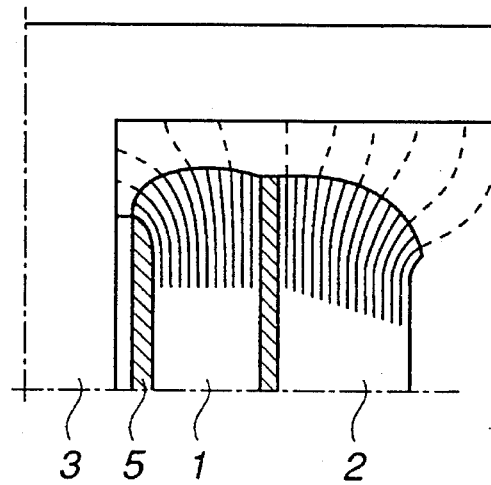
FIG. 2 shows how, according to the state of the art, conventional sheet-wound transformers are designed to keep the losses as low as possible.
Figure 3:
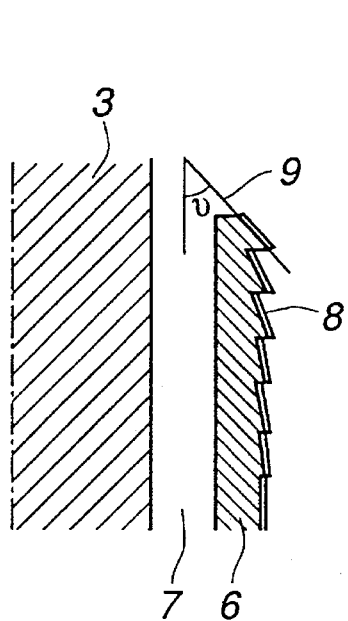
FIG. 3 shows how one end of a winding support body of a superconducting transformer winding according to the invention can be designed.

For a transformer/reactor with winding conductors with superconducting properties, it is suitable to provide a so-called cryostat wall between the core limb and the winding support body. FIG. 3 shows in a detailed embodiment a section of the end 6 of a winding support body. The cryostat wall is in FIG. 3 designated 7 and the superconducting tape of the winding is shown at 8.

FIG. 3 also shows how the angle "v" between a generatrix 9 to the above-mentioned straight frustum of a cone and the axial centre line of the support body increases out towards the ends of the support body. In this way, the support body terminates in a stepped, tapering form towards its ends.

Figure 4:
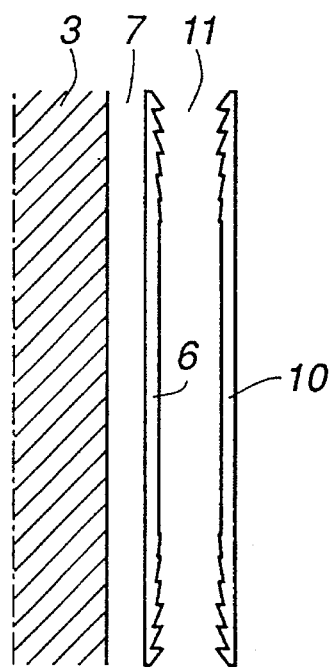
FIG. 4 shows winding support bodies for the two superconducting single-layered windings of the transformer.

FIG. 4 shows in a section the winding support body 6 in its entire axial length. A termination with a stepped tapering form of the slots out towards the other end of the support body, corresponding to the embodiment shown in FIG. 3, is also clear from this figure. The magnetic field along the mid-portion of the winding extends parallel to the core limb, and therefore the mid-portion of the winding support body has a surface parallel to the core limb. This described part of FIG. 4 corresponds to the embodiment of a winding support body and a winding in a reactor and the inner winding support body with a winding in a transformer.

To achieve the same effect for an outer superconducting winding in a transformer, also this winding has to be fixed to a corresponding winding support body 10. From the point of view of section, this outer support body will have an inverted shape in relation to a plane half-way between the two support bodies. The space 11 between the two windings is intended for any insulation. Otherwise, as described above, the slot is helical along the ends of the support body such that the superconducting tape can be wound on the support body continuously with the desired number of layers.

What is claimed is:

1. A winding support body for a winding with conductors in the form of a superconducting tape, characterized in that the winding support body consists of a substantially straight, circular-cylindrical tubular body (6) and that, on the side of the body where the winding is to be placed and out towards the ends of the body, a helical slot is provided along the body with a plane surface with a width equal to the width of the tape such that each turn of the slot around the body practically forms the envelope surface of a straight frustum of a cone and that the angle (v) between a generatrix (9) of the envelope surface and the centre axis of the body increases for each turn out towards the ends of the body in such a way that the envelope surface for each turn at all points coincides with the direction of the magnetic field which is generated by the winding.

* * * * *